(12) United States Patent
Christman

(10) Patent No.: US 6,564,820 B2
(45) Date of Patent: May 20, 2003

(54) GAS FLOW STOP DEVICE

(75) Inventor: Stephen Christman, Niantic, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/973,229

(22) Filed: Oct. 9, 2001

(65) Prior Publication Data

US 2003/0066561 A1 Apr. 10, 2003

(51) Int. Cl.⁷ .............................. F16K 31/22; F16T 1/20
(52) U.S. Cl. ..................... 137/192; 137/202; 137/433
(58) Field of Search ................... 137/172, 192, 137/202, 409, 433, 15.26

(56) References Cited

U.S. PATENT DOCUMENTS

| | | | | |
|---|---|---|---|---|
| 1,897,492 A | * | 2/1933 | Ledoux | 137/433 |
| 4,104,004 A | * | 8/1978 | Graef | 137/202 |
| 4,304,206 A | * | 12/1981 | Hall | 137/192 |
| 4,327,764 A | * | 5/1982 | Biederman et al. | 137/192 |
| 4,425,933 A | | 1/1984 | Fetsch | 137/172 |
| 4,535,799 A | * | 8/1985 | Boley | 137/192 |
| 4,580,592 A | | 4/1986 | Clark et al. | 137/172 |
| 4,627,460 A | * | 12/1986 | Eising | 137/192 |
| 4,748,999 A | * | 6/1988 | Delwiche | 137/192 |
| 5,062,441 A | * | 11/1991 | Glukhov | 137/192 |
| 5,115,798 A | * | 5/1992 | Moore, Jr. et al. | 137/192 |
| 5,435,335 A | * | 7/1995 | Klop | 137/202 |
| 6,092,547 A | * | 7/2000 | Komiya et al. | 137/192 |
| 6,131,605 A | * | 10/2000 | Kothe et al. | 137/192 |

* cited by examiner

Primary Examiner—George L. Walton
(74) Attorney, Agent, or Firm—Linda A. P. Cunha

(57) ABSTRACT

The present invention provides a reliable regulating device that permits liquids, such as fuel oils, to be drained into the enclosure while preventing the flow of gases into the enclosure. The device includes a valve housing having a chamber for receiving the liquids and the gases and a drain valve means in open flow communication with the liquids and gases. The drain valve means includes a valve seat and a float member both located within the valve housing. The float member has a specific gravity less than the liquids passing through the device. The float member floats off the valve seat when the liquids flow through the valve housing and engages the valve seat when gases are present in the chamber preventing the gases from entering the enclosure.

11 Claims, 4 Drawing Sheets

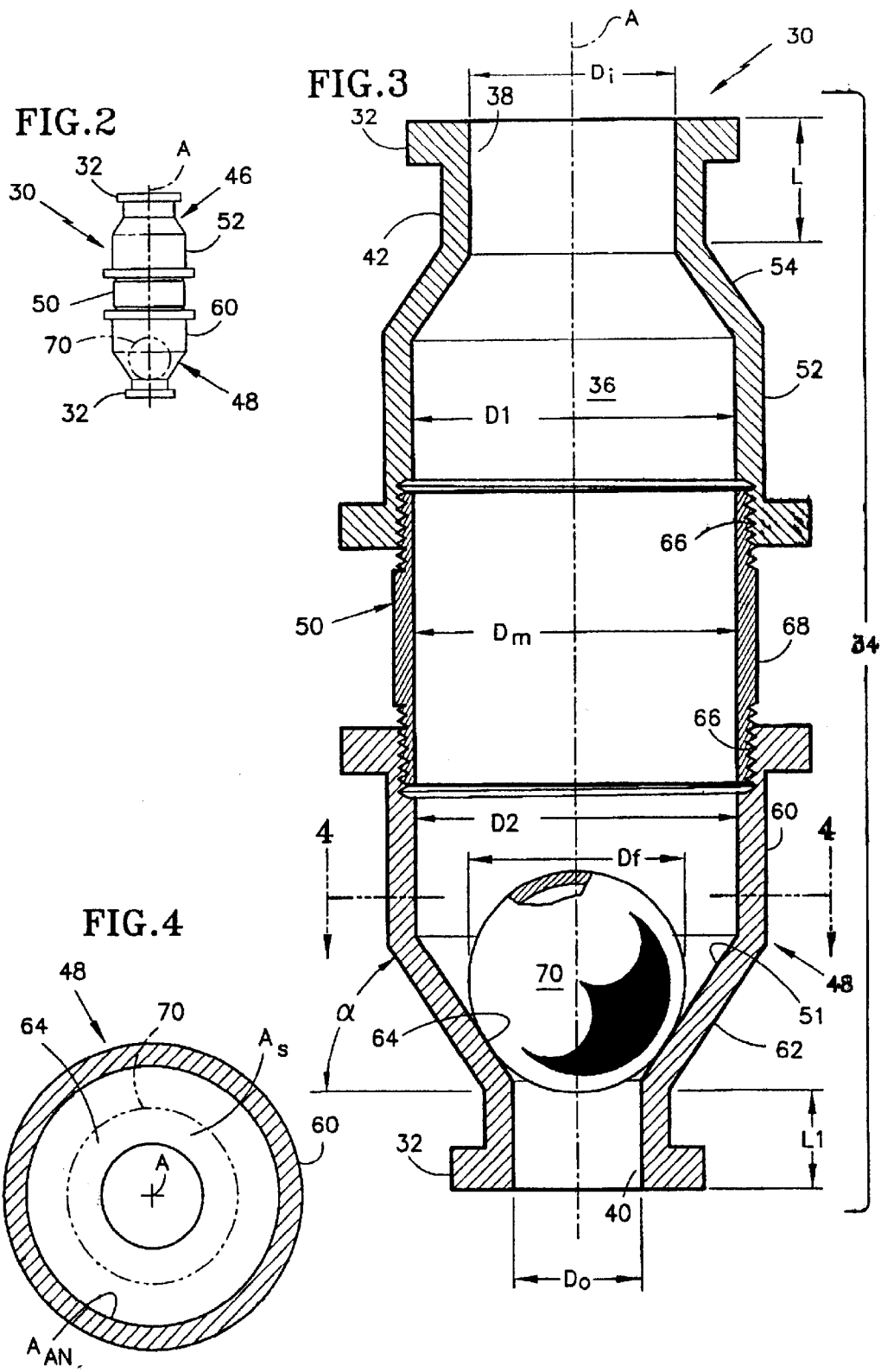

GAS FLOW STOP DEVICE

TECHNICAL FIELD

This invention relates generally to a device for draining liquids through an aperture and, more particularly, to a moveable valve member for draining liquids through an aperture and preventing the flow of gases through the same aperture, the device especially employed in systems adapted to ensure that gases are not allowed to enter and collect in an enclosure.

BACKGROUND OF THE INVENTION

Power plant facilities require large supplies of fuel that are necessary to operate the facility. At such power plant facilities, it is necessary to also have containment structures such as storage tanks or enclosures, typically located underground or below the earth line, to collect and store waste by-products, such as fuel oils, that are generated during operation of the facility. The enclosures collect and contain these waste by-products in order to prevent environmental contamination.

During such normal operations of the facility, the waste by-products that are liquids are sent through a conduit (flow passage) and into the enclosure. Waste gases, unlike waste liquids pass into the flow passage and are vented into the atmosphere, as opposed to being sent to the enclosure.

One of the problems that may be encountered during such operations is the accumulation of waste fuel gases inside the enclosure. It is common practice to prevent such accumulation of gases inside the enclosure by employing the control means to prevent the gases from entering and consequently, filling the enclosure and other enclosures that may be in flow communication with the enclosure. However, should the control means fail for any reason, gas would be permitted to enter the enclosure. This would be an undesirable situation.

Valve mechanisms for separating oil and water have been suggested. Clark et al., U.S. Pat. No. 4,580,592 shows an open vessel separator valve connected to a conduit at the bottom of the tank to drain the water that collects at the bottom of the tank. However, the valve disclosed in this reference is designed to be located at the bottom of the tank and is not adapted for use in a conduit through which liquids can flow to fill the tank. Fetsch et al., U.S. Pat. No. 4,425,933 discloses an oil and water separator for use in a secondary containment structure around a storage tank. The separator includes a float that is fixedly attached (hinged) to an actuator arm and is designed for operation underground and in a moat surrounding the tank. It is noted that these types of separation devices require the separation of fluids that have already been mixed in the tank such that the valves are used to eliminate one of the fluids that has previously accumulated inside the tank without draining the other fluid from the tank. These devices are also designed for use at the discharge or bottom section of the tank.

Therefore, what is needed is a reliable, simple, economic and non-manual device that permits liquids, such as fuel oils, to be drained into the enclosure while preventing the flow of gases into the enclosure. Such a device would be located at the flow entrance of the tank.

SUMMARY OF THE INVENTION

The above discussed and other drawbacks and deficiencies are overcome or alleviated by the present invention.

Accordingly, the present invention provides a reliable, simple and economic, device that permits liquids, such as fuel oils, to be drained into the enclosure while preventing the flow of gases, such as hydrocarbon fuels, e.g. natural gas, into the enclosure. The device is positive acting with a minimal number of parts and is not susceptible to the development of defects.

It is preferred that the device includes a valve housing having a chamber for receiving the liquids and the gases and a drain valve means that is in open flow communication with the liquids and gases. The drain valve means includes a valve seat and a float member. The float member is located within the valve housing and arranged to engage the valve seat to open and close an outlet in the valve housing. The float member has a specific gravity less than the specific gravities of liquids and more particularly, liquid fuels, e.g. diesel oil, gasoline, kerosene, etc. In this way, the float member floats off the valve seat when the liquids flow through the valve housing and engages the valve seat when gases are present in the chamber. Thus, the liquids within the chamber pass through the device and enter the enclosure while the gases within the chamber are prevented from entering the enclosure.

It is most preferred that the float member is made of anodized Aluminum, has a hollow interior and is spherically shaped. It is most preferred that the float member has a specific gravity less than approximately about 0.2. Also, the flow rate of the liquids entering into the chamber is of a predetermined flow rate. Preferably, the flow rate, the configuration of the device and the shape, material and size of the float member are optimized with respect to one another to permit the float member to float off the valve seat when liquids are present in the device and more particularly, the chamber. However, the valve housing and the float member could have alternative configurations which can produce the same effect of opening and closing the device and more specifically, permitting the flow of liquids and not gases present in the chamber. The valve seat is a machined surface that can have alternative configurations that match the contour of the float member.

BRIEF DESCRIPTION OF THE DRAWINGS

The present invention will now be described, by way of example, with reference to the accompanying drawings in which:

FIG. 2 is an outer side view of the device of the present invention showing a float member in phantom;

FIG. 3 is a side cross sectional view of the device of FIG. 2 showing the float member within a chamber and the valve seat;

FIG. 4 is a top cross-sectional view of the device taken along 4—4 of FIG. 3 showing the surface area of the valve seat;

BEST MODE FOR CARRYING OUT THE INVENTION

Figure 1:
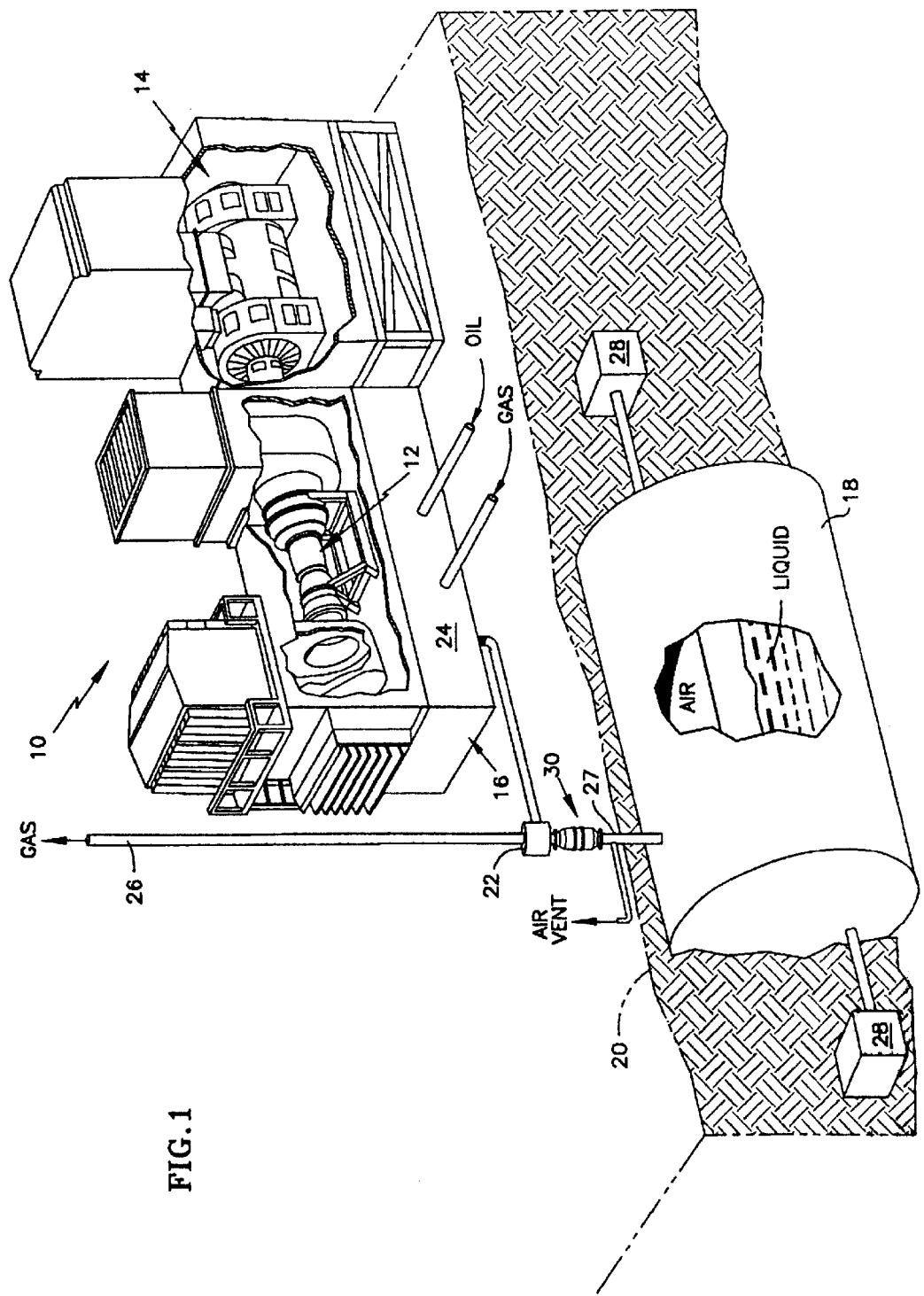
FIG. 1 is a schematic side elevational view of a power plant showing an underground enclosure.

Referring to FIG. 1, a power plant facility (power plant) 10 requires large supplies of fuel that are necessary to operate the facility as shown in FIG. 1. The facility 10 that generates electrical power to a transmission system may employ, for example, one or more industrial gas turbines (turbines) 12 connected to a generator 14. Industrial gas turbines 12 often are capable of selectively running on both liquid and gaseous fuels (e.g. natural gas). Consequently, these turbines 12 have both liquid and gas fuel supply systems 16. In addition to fuel supply tanks at the facility 10, it is necessary to also have containment structures 18 such as drain tanks or enclosures, typically located underground or below the earth line, shown by the broken line 20 in FIG. 1. The enclosures collect and contain waste fuel as well as other facility by-products generated by the power plants in order to prevent environmental contamination. The use of the facility 10 including the turbine 12 is for illustrative purposes only and is not a limitation of the instant invention which may be employed on steam turbines, combined cycle power plants and a variety of other industrial facilities.

The turbines 12 do not burn both gas and liquid fuels at the same time. Rather, when the turbine 12 burns liquid fuel, the gas fuel supply is turned off. Similarly, when the turbine 12 burns gaseous fuel, the liquid fuel supply is turned off. Valves, more particularly solenoid valves, generally control the control of the selected fuel from the fuel supply to the turbine 12. Thus, the solenoid valve controls the flow of fuel to the turbine 12 via a fuel plate (delivery system) 24.

During plant operations, the turbine 12 is necessarily drained when it is desired to switch fuel sources, for example from oil to gas. During such normal operations of the turbine 12, the waste liquids (fuel oil) are sent from the fuel plate 24, through a conduit (flow passage) 26 and into the enclosure 18. Generally, the flow passage 26 is vertically positioned such that gravity drains the liquids contained there in into the enclosure 18. Waste gases, unlike waste liquids, are discharged from the turbine 12, enter the fuel plate 24, pass into the flow passage 26 and vent into the atmosphere. When it is desired to direct the flow of fuel, not to the turbine 12 but to the enclosure 18, a control means 22, such as a solenoid valve, is used. The control means 22 prevents the gases from entering and consequently, filling the enclosure 18 and other enclosures that may be in flow communication with the enclosure 18.

Referring to FIGS. 2 and 3, a device 30 is shown that may be used, preferably in addition to the control means 22 (FIG. 1), in the flow passage 26. In this way, the device 30 provides an additional means to control the flow of liquids, e.g. liquid fuel, into the enclosure 18. The device 30 permits the fluids in the flow passage 26 to drain into the enclosure 18 of FIG. 1 while preventing the flow of gases, e.g. hydrocarbon fuels such as natural gas, to flow into the enclosure 18. The device 30 is disposed about an axis of symmetry, A. The device 30 is connected to the portion of the flow passage 26 (FIG. 1) preferably upstream of the enclosure 18 (FIG. 1) and downstream of the control means 22 (FIG. 1) using any suitable attachment means and methods known in the art, such as, but not limited to, welding and pipe threads. Also, the device 30 may include flanges 32 that are mechanically fastened to flanges (not shown) that are fitted onto the flow passage 26. In this way, the device 30 is attached to the flow passage 26 that preferably has the same outer diameter as the device 30 using pipe threads.

Further, the device 30 includes a valve housing 34 having a chamber 36. The valve housing 34 includes an inlet 38 and an outlet 40. Preferably, the inlet 38 is located at an upper end 42 of the chamber 36 thereby connecting the inlet 38 to an upper portion of the flow passage 26. The outlet 40 is located at an opposing lower end of the chamber 36 thereby connecting the outlet 40 to a lower portion 27 of the flow passage 26. The inlet 38 is in open communication with any gases and liquids that may be present in the flow passage 26. The outlet 40 of the device 30 is in flow communication with the enclosure 18. The outlet 40, or the lower portion 27 of the flow passage 26 is open to the atmosphere to allow air from the enclosure 18 to vent into the atmosphere as the enclosure 18 is being filled with the liquids that flow through the device 30. The device 30 may be supported by any means know in the art, such as a pipe support or, in the alternative, by the device 30 itself that is connected to the flow passage proximate the inlet 38.

The valve housing 34 is formed by a first flow reducer (first reducer) 46, a second flow reducer (second reducer) 48 and a mating member 50. The first reducer 46, the second reducer 48 and the mating member 50 are coaxial about the axis, A. The first reducer 46 includes a first section 52, a second section 54 and the outlet 40. Preferably, the first section 52 and the second section 54 are integral. The first section 52 has a diameter, D1, and the second section 54 decreases in diameter in the radial direction or concentrically inward about the axis A. In this way, the smallest diameter, $D_i$, of the second section 54 converges into the inlet 38 that extends outward therefrom an axial distance, L. More specifically, the second section 54 of the first reducer 46 is angled inward towards the axis, A, of the device 30. The diameter, D1, of the first section 52 is approximately about equal to the diameter, $D_m$, of the mating member 50.

The second reducer 48 includes a first section 60, a second section 62 and the outlet 40. Preferably, the first and second sections 60, 62 are integral. The second section 62 of the second reducer 48 decreases in diameter in the radial direction or concentrically inward about the axis A. In this way, the smallest diameter, $D_o$, of the second section 62 of the second reducer 48 converges into the outlet 40 where the outlet 40 extends outward therefrom an axial distance, L1. More specifically, the second section 62 of the second reducer 48 is angled inward towards the axis, A, of the device 30. Further, the second section 62 of the second reducer 48 is angled towards the axis, A, with an angle $\alpha$ as measured with respect to a line parallel to the axis, A. Thus, the second section 62 includes an angled inner surface 51. The diameter, D2, of the first section 60 is approximately about equal to the diameter, $D_m$, of the mating member 50. Thus, preferably D1, D2 and $D_m$ are approximately equal to each other and can define the diameter of the valve housing 34.

Referring now to FIGS. 2, 3 and 4, located within the inner surface area of the second section 62 is a valve seat 64. The valve seat 64 comprises a predetermined contact surface area, $A_s$ is highly machined such that it is effective as a gas seal. The surface area $A_s$ as shown in FIG. 4, is preferably a portion of the total area of the angled inner surface 51 of the second section 62. The angle $\alpha$ is predetermined to establish the contact surface area, $A_s$, of the valve seat 64 to further provide an effective gas seal as will be further described with reference to a float member 70. Preferably, the angle $\alpha$ is in the range of approximately about 25 to 30 degrees and most preferably, approximately about 25 degrees. It Is also noted that the contact surface area, As, is preferably within the range of 0.2 inches squared +/−0.05 inches squared.

The assembly of the valve housing 34 will now be described. The first section 52 of the first reducer 46 includes internal threads 66. The first section 60 of the second reducer 48 similarly includes internal threads 66. The first and second reducers 46, 48 are preferably connected to each other via by the mating member 50, most preferably a nipple or other similar attachment means. Most preferably, the mating member 50 is a sleeve member having external threads. In this way, the sleeve member threadingly engages the internal threads 66 of the first sections 52, 60 of the first and second reducers 46, 48, respectively, thereby retaining the first and second reducers 46, 48 together and defining the chamber 36.

The device 30 is in open communication with the gases and liquids that enter the chamber 36 from the upper flow passage. The device 30 also includes the valve seat 64 and the float member 70. The float member 70 is constrained to movement within the chamber 36 and is placed into one of reducers 46, 48 prior to the assembly of the valve housing 34.

The buoyant force, which acts upon an object submerged in a fluid, is equal to the weight of that body of fluid that the submerged object displaces. When the buoyant force is less than the weight of the object, the object will sink. On the other hand, if the buoyant force is greater than the weight of the object, the object will float. Therefore, in order to provide a plug which sinks in oil and floats in water, the volume of the plug and the weight of the plug are selected to provide a buoyant force for the plug in water which is greater than the weight of the plug and, on the other hand, a buoyant force for the plug in oil which is less than the weight of the plug.

The float member 70 is of a weight and volume such that it has a specific gravity less than liquids, preferably liquid fuels, e.g. diesel oil, gasoline, that flow in the upper portion of the flow passage 26. Preferably, the specific gravity of the float member 70 is less than approximately about 0.4. Most preferably, the specific gravity, SG, of the float member 70 is approximately equal to $A_{an}/[20A_o]<0.25$ when water is used as a medium. $A_o$ is the cross sectional area, $A_o$, of the outlet 40 of the device 30. Preferably, the outlet has a cross sectional area where the area is the area of a circle based on the diameter of the outlet, $D_o$. The cross sectional area of the annulus, $A_{an}$, is defined as the cross sectional area of the mating member 50, $A_m$, minus the cross sectional area of the float member 70, $A_f$. Therefore, it is known that if the float member 70 is spherical in shape and the valve housing is preferably cylindrical in shape, the cross sectional areas are defined by the area of a circle based on the float diameter, $D_f$ and the diameter of the valve housing, $D_2$. Most preferably, the relationship of the specific gravity of the float member 70 when liquid fuel is used as the medium is as follows: the specific gravity of the float member 70/specific gravity of the liquid fuel is approximately equal to $A_{an}/[20A_o]$. Preferably, the diameter of the float member 70 is approximately about 2.75 inches with a 24-gage wall thickness. The float member 70 is preferably spherical in shape. Further, the float member 70 may be of a hollow construction although a solid ball may work equally as well provided that the specific weight is the same as that of the hollow configuration. A spherical shape for the float member 70 permits any part of the surface suitable for sealing the outlet 40. The float member 70 may be made of a variety of materials, e.g. Aluminum and steel. Most preferably, the float member 70 is made of Aluminum. The diameter, $D_f$, (FIG. 2) of the float member 70 is less than the diameters, $D_i$, of the inlet 38 and the diameter, $D_o$, the outlet 40.

Figure 5:
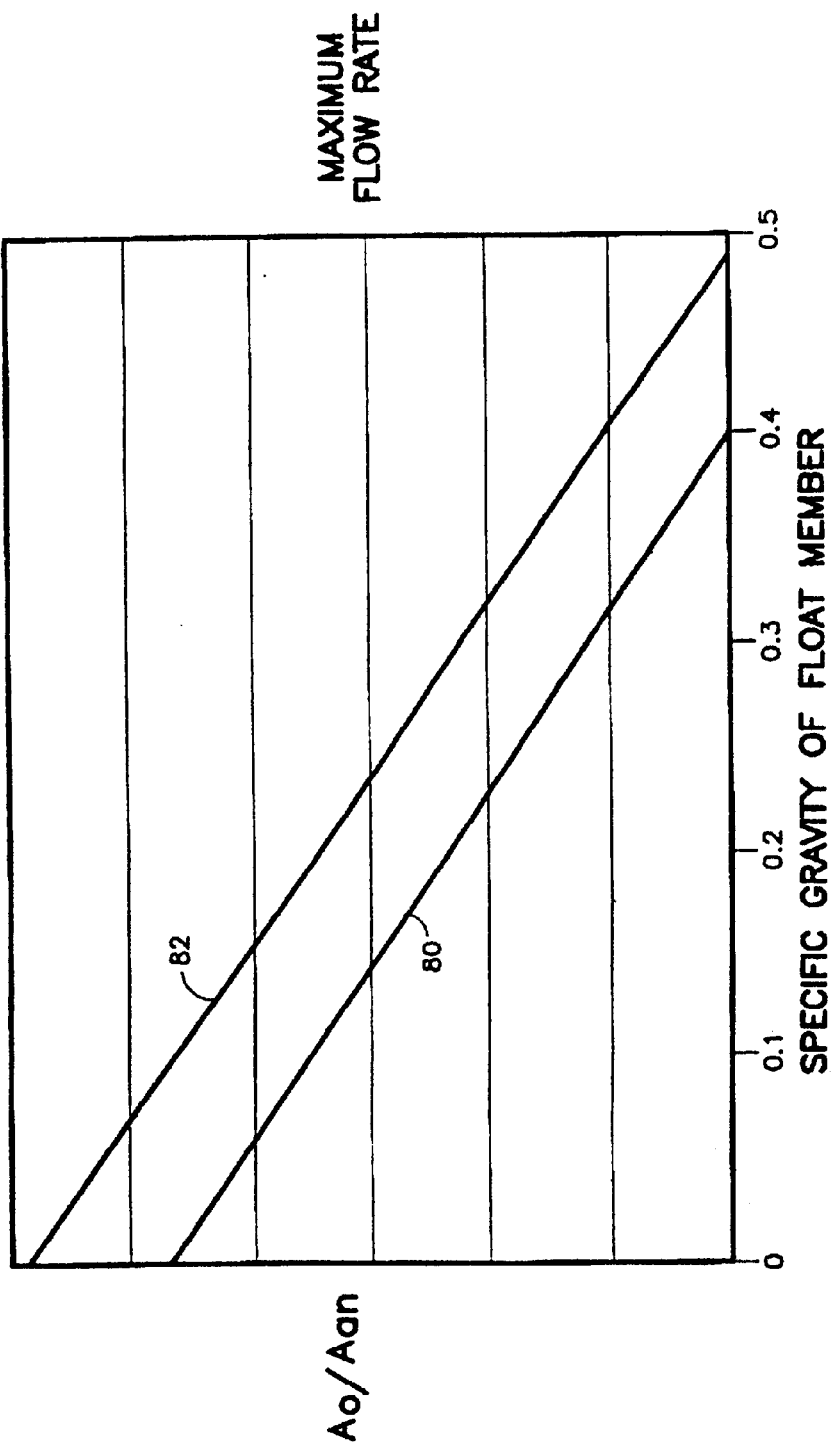
FIG. 5 is a plot of the specific gravity of the float member versus the ratio of the cross sectional areas of the outlet of the device of the present invention and the annulus flow area for the liquids flowing through the chamber of the device.

Referring now to FIG. 5, a plot of the specific gravity of the float member 70 versus the ratio (area ratio) of the cross sectional area, $A_o$, of the outlet 40 of the device 30 to the cross sectional annulus flow area, $A_{an}$. Line 80 is for liquid water while line 82 is for liquid fuel oils having a specific gravity of approximately about 0.8. Thus, FIG. 5 illustrates the preferred relationship between specific gravity, $A_o$ and $A_{an}$ so that the float member 70 is lifted off the valve seat 64 when the liquid water or liquid fuel, for example, is flowing through the device 30. The plot also indicates the maximum flow rate that can be achieved for a given specific gravity of the float member 70, area ratio and liquid. It is noted that and within the scope of this invention that other liquids and more particularly, liquid fuel oils such as petroleum fuels, having different specific gravities, for example above 0.78, may be used equally well with the device 30 of the present invention.

Referring again to FIGS. 2, 3 and 4, the operation of the device 30 will now be explained. More specifically, the movements of the float member 70 toward and away from the valve seat 64 within the chamber 36 will be detailed.

When gases such as air, are present in the chamber, the float member 70, acted upon be gravity, will engage the valve seat 64 creating a gaseous seal. This position of the float member 70 is shown in FIG. 3. The device 30 is in the closed position. Thus, any gases within the chamber 36 will be prevented from entering the lower portion 27 of the flow passage 26 and, more specifically, the enclosure 18. When liquids, such as fuel oils enter the chamber, the float member 70 due to its specific weight and configuration will be lifted off the valve seat 64 by the flow of liquids into the chamber 36. Thus, the liquids pass over the outer surface of the float member 70 between the float member 70 and the inner walls of the chamber 36 and are permitted to drain through the outlet 40, into the lower portion 27 of the flow passage 26, and into the enclosure 18. Now, the device 30 is in the opened position. It is noted that the liquids will pass through the cross sectional annulus area, $A_{an}$ when the device is in the opened position.

It is also noted that in order for the float member 70 to be lifted when liquids are flowing into the chamber 36, the float member 70 not only must have a specific gravity less than the liquids but also the flow rate of the liquids into the chamber 36 must be a predetermined flow rate. Further, a predetermined flow rate is required such that the flow of the liquids does not force the float member 70 in a downward direction causing the float member 70 to engage the valve seat 64 and block the liquids from exiting the chamber 36 through the outlet 40. The predetermined flow rate is a function of the diameters of the outlet 40, the float member 70 (e.g. shape, material, size), volume of the chamber 36 and diameter of the chamber 36. Preferably, the flow rate for the preferred embodiment of the present invention is approximately about 10 gallons per minute. Finally and more specifically, FIG. 5 shows the flow rate for the device 30 as a function of the specific gravity and the ratio of $A_o/A_{an}$.

Figure 6:
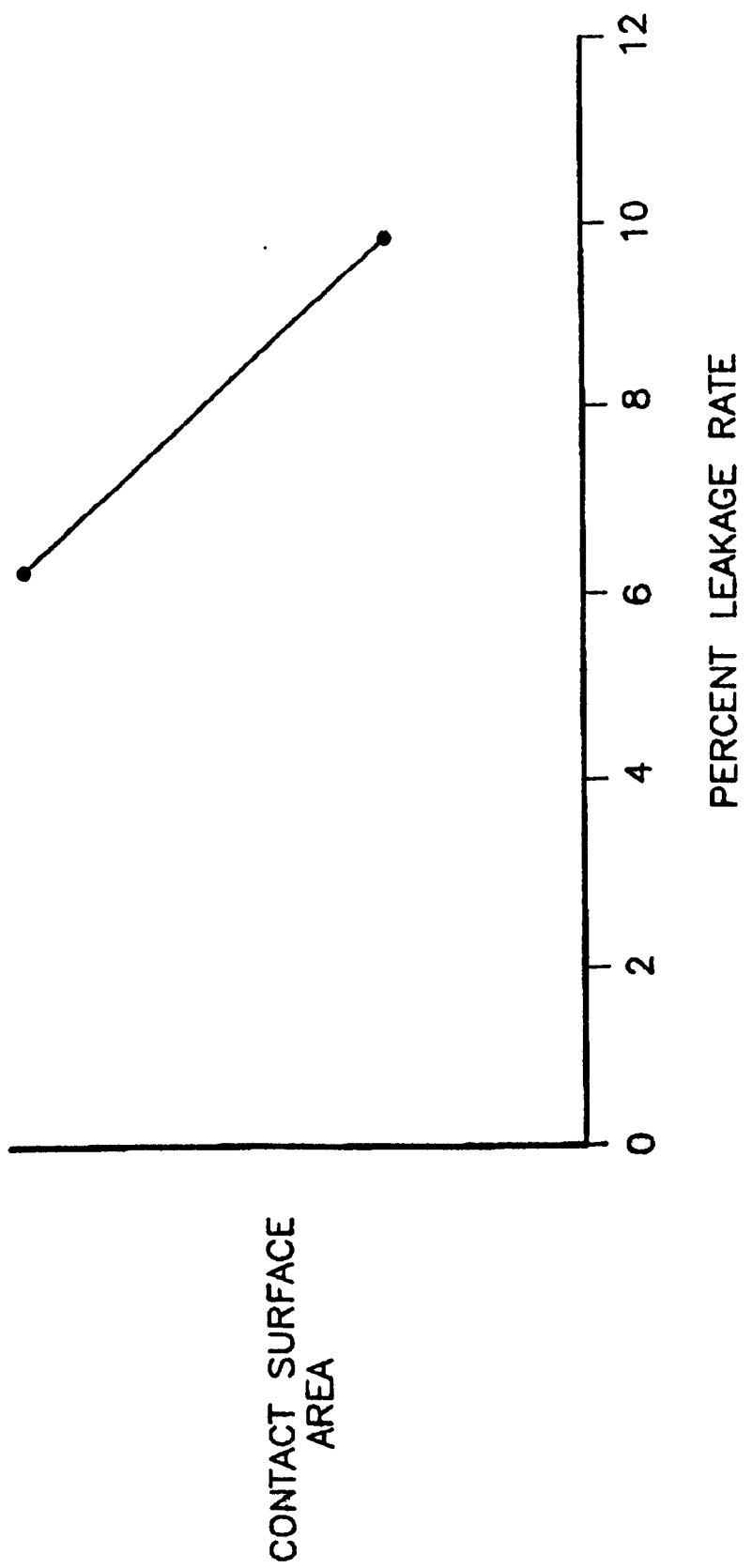
FIG. 6 a plot of the percent leakage rates vs. contact surface area, As, between the float member and the valve seat.

Referring now to FIG. 6, a plot of the percent leakage rate vs. contact surface area, $A_s$, between the float member 70 and the valve seat 64 is shown. The plot indicates the contact surface area, $A_s$, required to provide an effective gas seal. It is also noted that for a pressure of 30 pisg inside the chamber 36, the plot shows the relationship between the contact surface area and the percentage leak rate.

Referring again to FIGS. 2, 3 and 4, it is understood and within the scope of this invention that the exact specific gravity of the float member 70 can be regulated depending on the flow rate of the liquids into the chamber 36, the configuration (e.g. shape, material, size) of the float member 70 and the shape of the chamber 36.

Finally, the device 30 of the present invention advantageously a minimum number of parts to reduce manufacturing costs, and ensures reliable and continuous operation. The device is positive acting and is not susceptible to the development of defects. Thus, when the present invention is employed in the flow passages that enter enclosures, gases, such as combustible fuel gases, will not be permitted to pass into the enclosures thereby avoiding an undesirable situation. Liquids, such as fuel oils, will be permitted to pass through the flow passages in which the device is positioned to enter the enclosures. Further, the device 30 distinguishes over the prior art in that it is for use within a conduit where the draining of the liquids into the enclosure 18 and the prevention of the gases into the enclosure 18 is controlled by the float member 70 that is unrestrained.

As described above, the present invention can be implemented and utilized in connection with a variety of applications where it is desired to permit the flow of liquids and prevent the flow of gases. Further, the device 30 may be used to provide a back-up safety device in the flow passage 26 (FIG. 1).

Finally, it is within the scope of this invention and understood by those skilled in the art, that the angle α, the diameters of the inlet and the outlet 38, 40, respectively, the size, material and configuration of the float member 70 may be adjusted to accommodate different liquid flow rates and achieve the results of the present invention.

In the preferred embodiment corresponding to a maximum flow rate of 10 gallons per minute, the float member 70 is made of Aluminum with a specific gravity of 0.12, Af is approximately equal to about 6.0 inches squared (in.$^2$), Am, is approximately equal to about 7.5 in.$^2$, Aan is approximately equal to 1.6 in.$^2$ and Ao is approximately equal to 0.9 in.$^2$. In an alternative embodiment corresponding to a maximum flow rate of 6 gallons per minute, the float member 70 is made of steel with a specific gravity of 0.4, Af is approximately equal to about 6.0 in.$^2$, Am is approximately equal to about 7.5 in.$^2$, Aan is approximately equal to 1.6 in.$^2$ and Ao is approximately equal to 0.15 in.$^2$. It is also preferred that for both the preferred and alternative embodiments, Di is in the range of approximately about 1 to 2 inches. Finally, it is understood and within the scope of this invention that other materials may also be substituted for the float member 70 provided the specific gravity of the float member 70 falls within the preferred ranges provided herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

I claim:

1. A safety device forming part of a power plant liquid disposal system, the device for interposition in a flow passage in flow communication with the atmosphere and with an enclosure, the device for draining liquids having a predetermined specific gravity into the enclosure, the device comprising:

a valve housing having a chamber, said valve housing having an upper end and a lower end and a longitudinal axis;

an inlet at said upper end, said inlet in flow communication with the flow passage and receives either liquids or gases from the flow passage;

an outlet at said lower end, said outlet in flow communication with the enclosure, the liquids flow through said outlet into the enclosure;

a reducer in flow communication and converging into said outlet, said reducer having a section, said section decreases in diameter concentrically inward about said longitudinal axis and in the direction of said outlet, said section having an inner surface area forming a valve seat;

a selective flow control means, said means selectively permits gas or liquid to flow into the flow passage and enter said inlet; and a float member within said valve housing and arranged to engage said valve seat to open and close said outlet, said float member with a specific gravity less than the liquids, said float member moves unrestrained within said chamber and about the longitudinal axis and when only liquids are selectively flowing within the flow passage and enter the valve housing, said float member being configured to cause the liquids to flow into said valve housing at a predetermined flow rate thereby urging said float member to float off said valve seat to drain the liquids through an annulus and into said outlet into the enclosure and when only gases are selectively flowing within the flow passage and enter the valve housing, said float member being configured to engage said valve seat to prevent the gases from entering the enclosure thereby allowing the gases to continue to flow in the flow passage and vent to the atmosphere.

2. The device of claim 1 wherein said float member is spherically shaped.

3. The device of claim 1 wherein the material for said float member is selected from the group consisting of aluminum and steel.

4. The device of claim 2 wherein the predetermined flow rate of the liquids is less than or equal to 10 gallons per minute.

5. The device of claim 2 wherein said specific gravity of said float member is less than or equal to 0.4.

6. The device of claim 5 wherein said specific gravity of the liquids is greater than or equal to 0.78.

7. The device of claim 2 wherein said valve housing includes a first reducer in flow communication with said inlet and a second reducer in flow communication with said outlet, said first and second reducers joined by a mating member.

8. The device of claim 7 wherein said outlet is in flow communication to atmosphere to vent air from the enclosure when the liquids drain through said outlet.

9. The device of claim 2 wherein when the liquids in the flow passage is liquid fuel, the ratio of the specific gravity of said float member and the specific gravity of the liquid fuel is approximately equal to the ratio of the cross sectional area of said annulus and twenty times the cross sectional area of said outlet.

10. The device of claim 2 wherein when the liquids in the flow passage is water, the specific gravity of said float member is approximately equal to the ratio of the cross sectional area of said annulus and twenty times the cross sectional area of said outlet.

11. The device of claim 1 wherein the liquids comprise fuel oils and the gases comprise hydrocarbon fuels.

* * * * *